Nov. 3, 1964     O. F. GENZ     3,155,014

PLASTIC PISTON

Filed Jan. 23, 1961

*INVENTOR.*
ORVILLE F. GENZ
BY
*John P. Murphy*
ATTORNEY

United States Patent Office 3,155,014
Patented Nov. 3, 1964

3,155,014
PLASTIC PISTON
Orville Ferdinand Genz, Elmwood Park, Ill., assignor to Garlock, Inc., Palmyra, N.Y., a corporation of New York
Filed Jan. 23, 1961, Ser. No. 84,317
3 Claims. (Cl. 92—244)

This invention relates to fluid pressure cylinders, and more particularly, to a piston for use in such cylinders.

One of the problems associated with fluid pressure cylinders such as for fluid pressure motors concerns the disposition of a piston within the cylinder whereby maximum efficiency of the piston may be realized without a corresponding high rate of wear of the piston or of means associated therewith and in contact with a wall of the cylinder. One such means associated with the piston is the packing or sealing means for effecting a fluid-tight seal for the purpose of maintaining the required fluid pressure within the cylinder. Another such means is a conventional wear member which may be conventionally disposed on, or carried by the piston to absorb wear and thus reduce the wear of the first mentioned means due to friction as the piston reciprocates.

The main purpose, and also the main problem with prior art devices is to maintain coaxiality of the piston and its associated means with respect to the cylinder so as to operate efficiently as a fluid pressure motor and to extend the useful life of the piston and its means. However, devices presented heretofore have included combinations of a cylinder and a wear ring carried thereby for reciprocating within the cylinder; it being the purpose of the wear ring to absorb the friction effects and to maintain coaxiality of the piston and the cylinder. It is obvious that the wear ring must necessarily be fabricated to close tolerances. Similarly, the piston must also be formed with a groove or other means to carry the ring. Since the ring size and shape is critical, and also due to the fact that it is piloted on a reciprocating member, the piston; it follows that the means for carrying the wear ring or the like must be formed to a tolerance close enough to prevent undue "play" or backlash of the wear ring, yet not so close as to prevent the required expansion and contraction of the wear ring during changes in operating temperature of the motor.

All of the above not only contributes to an expensive device, but also detracts from the possible efficiency and long life of the piston and its associated means.

Another disadvantage of the prior art devices is that the wear absorbing means therein disposed exposes a continuous edge or face to the fluid operating medium of the cylinder. This has a well known deleterious effect during operation, especially where the motive fluid is hydraulic fluid or the like. The condition is due to the shear plane that occurs at the intersection of the edge of the wear absorbing means and the cylinder wall during movement of the piston. It is at this intersection that the molecules of motive fluid tend to "pile up" while seeking an escape channel through the wear means, and thus tend to erode the edges of the means, thus also tending to inhibit the movement of the piston. Consequently, heat is produced, and a high rate of wear is induced incident to the resultant expansion of the wear means abnormally against the cylinder wall and erosion of the wear means by the motive fluid. Moreover, it is important to note that, as the wear means of the prior art thus expands against the cylinder wall due to the shear plane and the heat, an undesirable combination ring effect occurs, with the wear means thus tending to perform as a sealing means due to the incident scraping action against the cylinder wall. Additionally, the cylinder wall is very often caused to become scored, not only by the abnormal scraping described above, but also by any slight impurities or other foreign matter which may often be conveyed by the motive fluid.

It is therefore a main object of this invention to provide a piston for a cylinder whereby a condition incident to the operation of the cylinder is turned to advantage causing the bearing and wear absorbing functions to be performed and coaxiality of the piston and cylinder is maintained.

It is another object of this invention to provide a piston in view of the foregoing object while at the same time obviating the requirement for observing close tolerances during the fabrication of the piston.

It is another object to provide a piston in view of the foregoing objects while eliminating an otherwise conventional member thereof to result in a new simplified combination.

It is another object of this invention to provide a new combination of parts and to thereby produce a new and useful effect in a piston for a cylinder.

It is another object of this invention to provide a new piston wherein the wear means breaks up the shear plane of motive fluid, whereby the motive fluid does not tend to inhibit the movement of the piston.

In carrying out the objects of the invention there is provided a piston for being attached to a piston rod for reciprocal movement in a cylinder, and wherein the piston may include at least two body members having a diameter less than that inside the cylinder, sealing means carried by the piston, means formed in a body member for breaking up the shear plane of motive fluid in the cylinder, and the body members being formed of a material having a coefficient of expansion greater than that of the material of the cylinder.

Further advantages and features of the invention will become manifest from the following detailed specification, when read with reference to the accompanying drawing, in which.

Figure 1:
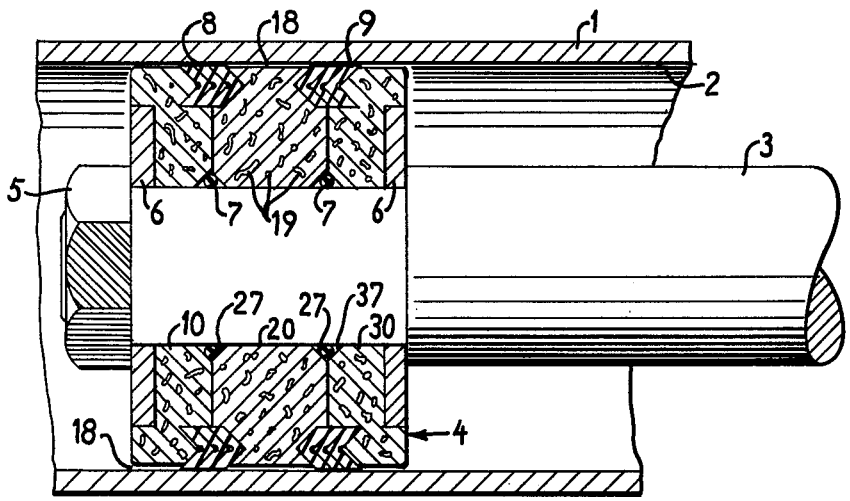
FIGURE 1 is a longitudinal cross section of a portion of a fluid pressure cylinder, illustrating an embodiment of a piston according to this invention.

In FIGURE 1 there is illustrated a portion of a substantially conventional fluid pressure motor cylinder 1, having an inside wall 2. It is well known that the cylinder 1 is formed of a high strength material, such as a steel alloy or the like having a low coefficient of expansion. This is because, during operation of the motor, which for purposes of discussion and illustration, may be for use with hydraulic fluid, operating temperatures may range from the existing environmental temperature to as high as 250° F. The cylinder illustrated herein may be considered to be a double acting type; that is, of the type wherein the piston operates in both directions.

Disposed in the cylinder 1 is a reciprocal piston rod 3, in the conventional manner. Attached to the piston rod 3 for reciprocation within the cylinder is a piston assembly 4; which is secured by means of a nut 5 or the like threaded on the end of the piston rod.

The piston assembly 4 comprises body sections 10, 20 and 30, sealing or packing means 8 and 9, compression washers 6, and static pressure seals 7. It will be noted that the conventional wear ring is omitted, as will appear. The body sections 10, 20 and 30 are formed from a reinforced plastic material. The material itself may be selected from the group or groups including the nylon type of plastic or substantial equivalent. It is pointed out that the material selected has a relatively higher coefficient of thermal expansion with respect to the material of the cylinder 1, as will be explained. Reinforcement of the plastic material of the body sections is accomplished by the expedient of glass fibers or the like embedded in disoriented fashion in the plastic material. These disoriented fibers are graphically illustrated as at 19 in FIGURE 1.

The body members are fabricated so that the piston assembly 4 as a whole has a diameter less than that inside the cylinder 1. Thus, a space 18 remains following assembly of the piston 4 into the cylinder 1 on the piston rod 3. It will be understood that, due to the high coefficient of thermal expansion of the plastic material, the space 18 will be variable depending on the environmental temperature when the cylinder is not operating. In order to vary the dimension of the space 18 according to the environmental temperature, means is provided for varying the diameter of the piston assembly 4 by compression. The compression washers 6 may be conventional steel or similar material washers disposed in a suitable cavity 13, FIGURE 2, and extending radially from the bore through the piston assembly 4 outwardly nearly to the outside diameter of the piston. By simply tightening the nut 5 against the piston, the piston may be compressed, and vice versa to change the diameter thereof slightly. A variable size space 18 is therefore purposely formed between the surface of the piston assembly 4 and the inside wall 2 of the cylinder 1.

The piston assembly 4 comprising the body members 10, 20 and 30 also forms means acting as the bearing, or wear member. In the embodiment shown, it will be seen that the body members form a multiple point bearing for the piston. In this embodiment, the three body members actually form a three point bearing. Conventionally, one or two wear rings would be carried by the piston body in grooves, whereby the wear rings would be piloted by the body of the piston. In this inventive concept, the body members form the bearing or wear means, and are piloted directly from the piston rod 3. This new arrangement forms a bearing and wear means having a maximum degree of stability since it is securely fastened to and is carried by the piston rod 3.

Substantially conventional packing means in the form of chevron rings 8 and 9 is carried by the piston body members. Another feature of this invention is that the body members also form integral adapter means for holding the packing means, precluding any requirement for separate means therefor.

Figure 2:
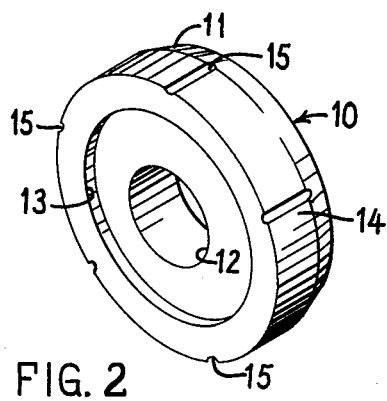
FIGURE 2 is an enlarged perspective view of one body member of the piston of FIGURE 1.

Body member 10, FIGURES 1 and 2, comprises a solid body of reinforced plastic material having a smooth outside surface 14 of diameter less than the inside diameter of the cylinder 1. An axial bore 12 is provided for mounting the body member on the piston rod 3. A suitable cavity 13 is formed in the frontal face of the body in which is disposed the compression washer 6. Formed in the outside surface 14 of the body member 10 are a number of spaced longitudinal grooves 15. While it may be preferred to form the grooves 15 parallel to the axis of the member 10; it is to be understood that other applications may make it preferable to dispose the grooves 15 other than as illustrated.

Figure 3:
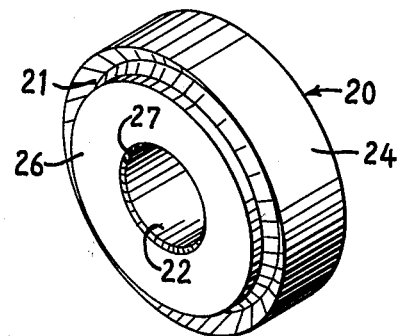
FIGURE 3 is an enlarged perspective view of another body member of the piston of FIGURE 1.

Body member 20, FIGURES 1 and 3, comprises a solid body of reinforced plastic material having a smooth outside surface 24 of diameter less than the inside diameter of the cylinder 1. An axial bore 22 is provided for mounting the body member on the piston rod 3. A bevel 27 is formed at the intersection of the bore 22 and the face 26 of the body member. A similar bevel is formed adjacent the bore 12 on the back side of the member 10. When the body members are assembled on the piston rod 3, an O ring 7 is disposed in the space provided by the bevels to seal against static pressure along the piston rod 3. Female adapter means 21 is formed in each face of the member 20, for receiving the packing rings 8 and 9.

A male adapter means 11 is also provided in the face of the member 10, which when assembled with member 20 holds the packing rings 8.

Figure 4:
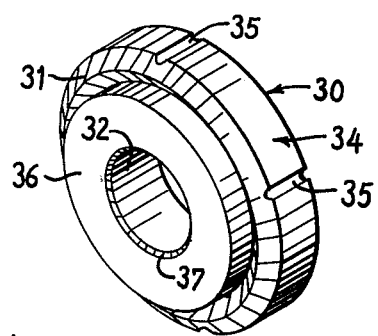
FIGURE 4 is an enlarged perspective view of another body member of the piston of FIGURE 1.

The body member 30, FIGURES 1 and 4, comprises a solid body of reinforced plastic material having a smooth outside surface 34 of diameter less than the inside diameter of the cylinder. An axial bore 32 is provided for mounting the body member on the piston rod 3. A bevel 37 is formed at the intersection of the bore 32 and the face 36 of the body member. The bevel 37, and the corresponding bevel 27 of the member 20 form means in which is disposed an O ring 7 for sealing against static pressure along the piston rod 3. Male adapter means 31 on the member 30 and the corresponding female adapter means 21 on the member 20 also form complete adapter means for the packing rings 9. Longitudinally spaced grooves 35 are formed in the outside surface 34 of the member 30. It is therefore apparent that members 10 and 30 are identical; however each is mounted on the piston rod 3 facing in opposite directions. Thus, this embodiment of the piston is for a double acting cylinder.

The cylinder is not shown in its entirety, since such structures are well known in the art. However, it will be assumed that the cylinder 1 is of the type normally associated with a source of fluid under pressure and such devices incident to the direction of such fluid into the chambers of the cylinder for moving the piston 4 and rod 3 to perform work. Fluid motors of this type are employed on trucks, tractors, lifting machinery and the like.

In describing the operation of the invention, one of the main features of this concept will become apparent. The body members 10, 20 and 30 forming the piston assembly are operable, in response to an increase in the temperature of the motive fluid, as a multiple point bearing for the piston assembly as a whole. That is to say, thermal expansion of the reinforced plastic body members increases the diameter of the same during operation; causing the outside surfaces, 14, 24 and 34 respectively, to bear against or otherwise engage the inside wall 2 of the cylinder 1. This is because the higher coefficient of expansion of the plastic material relative to the coefficient of expansion of the cylinder causes the plastic material to react sharply and sensitively in response to increase in temperature of the motive fluid due to compression during operation. Thus, the piston assembly body members are not required to be made to dimensions having critical tolerances as in conventional pistons. At assembly of the piston into the cylinder, and at non-operating periods the piston is of smaller diameter. After operation begins, the motive fluid becomes hot and causes the piston to expand and engage the inside wall 2 of the cylinder and operate not only as a piston but also as a bearing and wear absorbing member. Due to the absence of tolerances the compression washers 6 form means for varying the diameter of the piston. This is accomplished by turning the nut 5 either to compress or release the body members of the piston assembly 4 slightly to ensure proper engagement of same with the cylinder wall 2.

It has also been found that by forming the spaced longitudinal grooves in the surface of the body members a true bearing effect is the result. Thus, the operation of the embodiment of FIGURE 1 will be described, it being assumed that the piston 4 is positioned in the cylinder 1 at an end thereof to the viewer's right, and that the piston assembly 4 is beginning its return stroke, not under power, to the left end of the cylinder for a new power stroke. The piston must also move fluid (not shown) ahead of it and out of the chamber of the cylinder. As the piston 4 moves from right to left (at times with great speed), the piston is suspended coaxially within the cylinder 1 by the body members 10, 20 and 30 which are also integral bearing means. As a shear plane, created by a "pile-up" of molecules of motive fluid, builds up adjacent the leading edge of the body member 10 along the cylinder wall 2; the fluid, and any impurities which may be suspended therein, is funneled or channeled through the spaced grooves 15 past the leading edge of the member 10. The impurities are thus caused to be deposited in the grooves 15 by reason of the lateral flow of fluid toward the grooves in relief of the shear plane. The shear plane is thus also broken down. It will be apparent therefore that erosion of the leading edge of the body member, and the resultant short life span, is eliminated. An identical condition occurs with body member 30 and grooves 35 when the piston 4 moves in the opposite direction.

The important result is that the piston according to this concept is made integral with the bearing and wear means, not by the addition of such means, but by being one and the same. A piston according to this concept is sturdier and far more stable because the bearing and wear means is piloted directly from the piston rod 3, and not from a groove or the like fashioned in the body of the piston. Thermal expansion of the plastic material of the piston body members 10, 20 and 30 insures that a greater degree of stability and more perfect bearing action is the result, with a much more highly economical construction devoid of the usual requirements for close tolerances and the like. At the same time, the motive fluid accummulating in the grooves creates pressure therein, augmenting the bearing action of the piston body members and further assuring coaxiality of the piston assembly. Inasmuch as the grooves 15 and 35 are spaced around the circumference of the body members, the additional pressure within the grooves tends to force the piston body members toward the piston rod and permit a film of motive fluid to exist between the surface of each body member and the cylinder wall 2. In this manner the body members of the piston are prevented from performing a sealing function due to outward expansion, while the packing rings 8 and 9 continue to perform only their predetermined sealing function.

While the embodiment shown and described has three body members, it is the principal feature of this invention that the combination of the piston assembly include at least two body members formed of a plastic material having a higher degree of thermal expansion than the material of the cylinder, and being formed to a diameter less than the inside diameter of the cylinder. Compression means is provided in the form of the compression washers 6 facing or disposed against the faces of the piston assembly 4 and carried by the piston rod 3. At the same time, the nut 5 threaded on the piston rod 3 forms means for varying the diameter of the body members by acting against one of the compression washers to thus compress the body members between the washers. By this expedient, the nominal size of the piston assembly is under full control in the absence of close tolerances during fabrication; with the body members being adapted to expand into engagement with the cylinder wall in response to an increase in the operating temperature. Another most important feature of the invention has become apparent in that the body members are mounted or carried rigidly on the piston rod, whereby the body members are piloted directly from the piston rod, and true bearing and wear means and coaxiality of the piston and cylinder is ensured.

It is also pointed out that the adapter means formed in the body members for carrying the packing rings, when upon expansion due to an increase in temperature, forms a part of the bearing means of the body members. The life of the packing rings is thus lengthened because the packing rings do not carry any bearing load.

The spaced longitudinal grooves formed in the surface of the body members prevent erosion and breaking of the body members under load; and also prevent scoring of the cylinder wall by forming a flow pattern for the motive fluid whereby any impurities therein are caused to accumulate in the grooves during operation. Hyperstress is precluded because the shear plane is broken down.

Thus, with this inventive concept there is provided a plastic piston assembly having the bearing means and body of the piston integrally formed resulting in a more efficient, multiple point bearing having better performance and longer life than has been presented heretofore.

A specific embodiment having been shown and described for the purpose of illustration, it is to be understood that the invention is not to be limited thereto; but is to be construed in the spirit of the appended claims.

I claim:

1. A piston assembly attached to a piston rod for being reciprocated in a cylinder comprising at least two body members having a diameter less than the inside diameter of the cylinder when the piston assembly and cylinder are at environmental temperature, packing rings carried by the piston assembly in contact with the wall of the cylinder, said body members being formed of a plastic material having a higher degree of thermal expansion than the material of the cylinder, said body members being adapted to expand into engagement with the wall of the cylinder in response to an increase in the operating temperature.

2. A piston assembly attached to a piston rod for being reciprocated in a cylinder comprising at least two body members having a diameter less than the inside diameter of the cylinder, packing rings carried by the piston assembly, spaced longitudinal grooves formed in the surface of each said body member, said body members being formed of a plastic material having a higher degree of thermal expansion than the material of the cylinder.

3. The combination of a piston assembly attached to a piston rod for being reciprocated in a cylinder including at least two body members having a diameter less than the inside diameter of the cylinder, said members being formed of a plastic material having a higher degree of thermal expansion than the material of the cylinder, packing rings carried by the piston assembly, a compression washer disposed against each face of the piston assembly and a threaded nut on the piston rod for varying the diameter of said body members, and spaced longitudinal grooves formed in the surface of each said body member, said body members being adapted to expand into engagement with the cylinder wall in response to a rise in the operating temperature.

References Cited in the file of this patent

UNITED STATES PATENTS

| 2,285,863 | Jeffrey et al. | June 9, 1942 |
| 2,665,179 | Salvatora | Jan. 5, 1954 |
| 2,718,444 | Harris | Sept. 20, 1955 |

FOREIGN PATENTS

| 1,208,786 | France | Sept. 14, 1959 |